Jan. 31, 1967   R. P. LAPPALA ETAL   3,301,738
TEAR RESISTANT MATERIAL COMPRISING PERFORATED SHEET
Original Filed Sept. 8, 1958   2 Sheets-Sheet 1
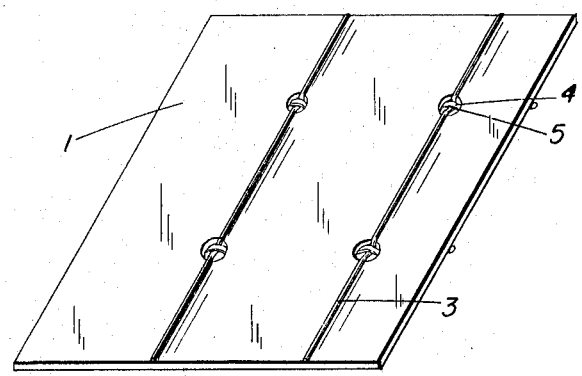
FIG. 1
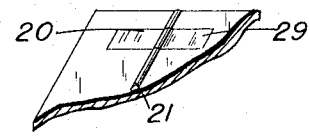
FIG. 5
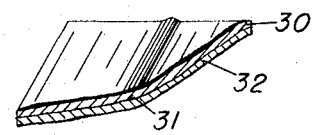
FIG. 6
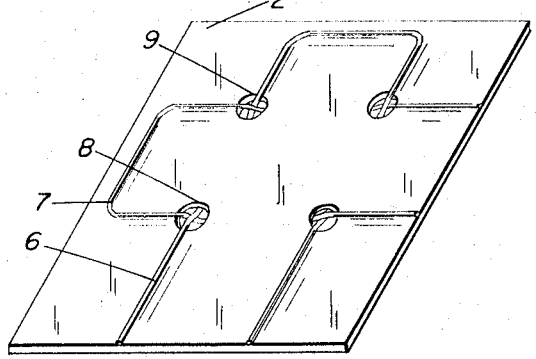
FIG. 2
FIG. 7
FIG. 8
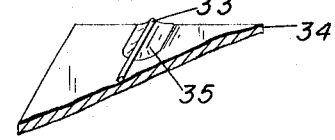
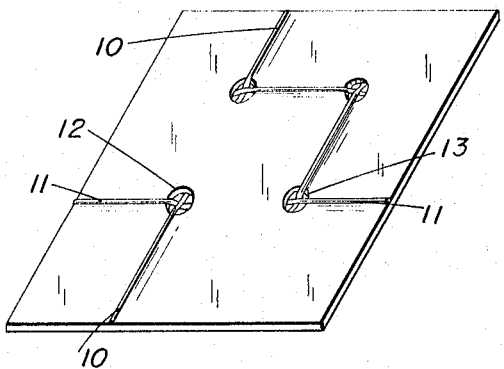
FIG. 3
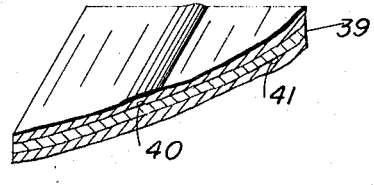
FIG. 9
INVENTORS.
JOHN M. DIEHL
NICHOLAS J. HAIGHT
RISTO P. LAPPALA
BY
Attorney Jan. 31, 1967 R. P. LAPPALA ETAL 3,301,738
TEAR RESISTANT MATERIAL COMPRISING PERFORATED SHEET
Original Filed Sept. 8, 1958 2 Sheets-Sheet 2
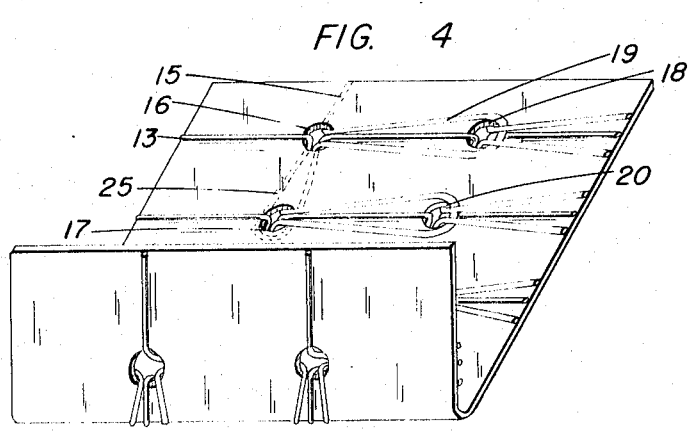
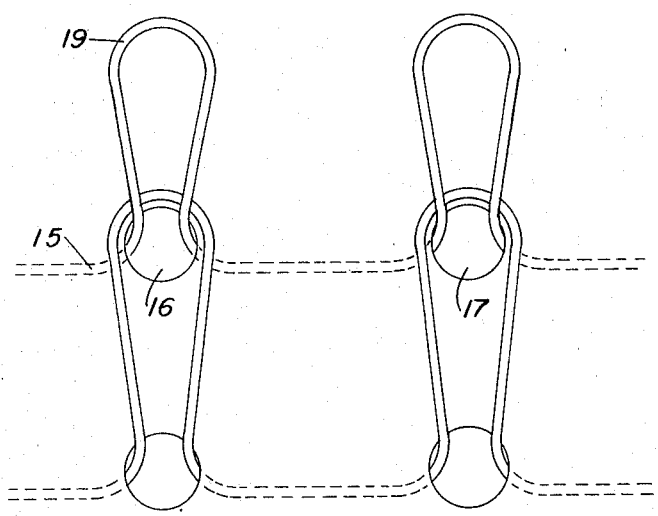
INVENTORS.
JOHN M. DIEHL
NICHOLAS J. HAIGHT
RISTO P. LAPPALA
BY
Attorney

United States Patent Office 3,301,738
Patented Jan. 31, 1967

3,301,738
TEAR RESISTANT MATERIAL COMPRISING PERFORATED SHEET
Risto P. Lappala, Houston, Tex., and Nicholas J. Haight, Waterloo, and John M. Diehl, Madison, Wis., assignors to Griffolyn Co., Inc., Madison, Wis., a corporation of Delaware
Continuation of application Ser. No. 759,456, Sept. 8, 1958. This application Dec. 11, 1963, Ser. No. 331,642
5 Claims. (Cl. 161—49)

This application is a continuation of my continuation-in-part application Serial Number 759,456 filed September 8, 1958 having the same title, now abandoned, which is a continuation-in-part of Serial Number 637,982 filed February 4, 1957, now United States Patent Number 2,851,389.

This invention relates to a material comprising one or more flexible films of material having therein disposed a plurality of tear resistant means.

Sheet materials in general, and synthetic resin film materials in particular, are characterized by the property that once a rupture occurs in the sheet as by the sheet being punctured or otherwise stressed to failure the area of failure may be propagated throughout the material with relative ease. In sheets containing oriented fibers such as paper manufactured from chemically digested cellulose fibers the tear resistance of the material may be relatively great in a direction normal to the direction of orientation of the fibers, but is low in a direction parallel to the fiber orientation.

This invention provides an article wherein at least one sheet of material having loosely woven reinforcing strands interlaced therethrough provides a tear resistant construction for sheet materials.

Heretofore it has been known to reinforce sheets of single materials or of laminated films with strands of material adhered either to the outer sides of the material or laminated within the structure. These articles have required the reinforcing strands to be adhered to the sheet material or molded within the laminated sheet structure or otherwise associated with the sheet material by fastening materials external to the reinforcing strands.

The present invention provides a sheet material through which reinforcing strands are interlaced, the strands being loosely woven one with another. The strands are supported by being passed through a plurality of apertures in the sheet material and not by the imposition of means causing them to be closely adjacent and firmly adherent to the sheet material as by being molded within the material or adhesively affixed to the sheet. It is to be observed that strands of reinforcing material are present on both sides of a reinforced material of the present invention and the strands are dependent upon passing through the sheet of material for support. It is within the scope of the present invention, however, to provide a laminated article that contains at least one reinforced sheet as one layer in the laminated article. Of course, a reinforced sheet according to the invention which is used in this manner will have strands that are disposed so as to be in contact with an adjacent laminated layer and fixedly sealed within the laminated structure.

It has been found that loosely woven strands disposed about a flexible sheet in the manner of the invention act to prevent tear propagation in the sheet material by slidably moving through the sheet apertures and across each other to a displaced position extending across the area in front of and adjacent to the path of the propagation of a rupture in the sheet. A plurality of strands so displaced bunch into a cord or rope-like formation that offers extreme resistance to tearing of the sheet material. It is readily understood that the greater the length of the tear that exists in the sheet material, the greater are the number of strands that form ino a bunch to resist further tearing of the material. The effectiveness of this configuration of reinforcing strands in preventing tear propagation is dependent on the degree of restraint to which the strands are subjected which is determined by the size of the sheet apertures and by the weave used. In one embodiment of the invention one half of the strands are located on either side of the sheet of material in such a manner that a preponderant portion of any one strand is positioned on one side of the sheet only. This weave is achieved by passing a bight or loop of a strand through an aperture and passing a bight or loop of an interwoven strand on the opposite side of the sheet through the eye so formed. The material of the invention comprised of this weave configuration enables each strand to be displaced a relatively great distance to the point of tear propagation and provides a material having very great resistance to tears that have progressed several inches through the material.

Other weaves achieve similar results in varying degrees of resistance, the relatively more tightly woven configurations offering greater initial resistance to tears, but lesser total resistance to greatly progressed tearing.

It is an object of our invention to provide a tear resistant material.

Another object is to provide a material having strands or reinforcing members interwoven therethrough wherein said strands serve to build up adjacent to and across a tear thusly serving to deter propagation of same.

Another object is to provide a material having strands on both sides of said material wherein said strands are slidable on said material.

Other objects will become apparent from the drawings and from the following detailed description in which it is intended to illustrate the applicability of the invention without thereby limiting it to a scope less than that of all equivalents which will be apparent to one skilled in the art. In the drawings like reference numerals refer to like parts and in which:

FIGURE 1 is a perspective view of a small portion of a sheet according to the invention;

FIGURE 2 is a perspective view of a small portion of a sheet according to another embodiment;

FIGURE 3 is a perspective view of a small portion of a sheet according to another embodiment;

FIGURE 4 is a perspective view of a small portion of a sheet according to another embodiment;

FIGURE 5 is a perspective view of a small end portion of a sheet showing one type of end fastening means;

FIGURE 6 is a perspective view of a small end portion of a two-ply sheet;

FIGURE 7 is a perspective view of a small end portion of a sheet showing another type of end fastening means;

FIGURE 8 is a perspective view of a small end portion of a sheet showing another type of end fastening means;

FIGURE 9 is a perspective view of a small end portion of a three-ply sheet; and

FIGURE 10 is a schematic view of the sheet of FIGURE 4.

According to the invention FIGURE 1 shows a portion 1 of a sheet of a transparent flexible synthetic resin of the type described in the co-pending application containing strands 3. In no case are the strands adhered to the sheet except along the edges of said sheet. It can therefore be seen that the strands are slideable to a degree along the surface of said sheet. The strands are indicated generally as 3 and may be monofilamentary or multifilamentary, twisted or untwisted but usually containing from ½ to 1 turn per inch and thus being only slightly twisted although generally referred to as untwisted (twist may be from ½ turn per foot to about 4 turns per inch). Monofilamentary yarns are generally not preferred due to low resistance to repeated sharp bendings. Strands of either inorganic materials (steel, aluminum, glass, etc.) natural organic materials or synthetic organic materials may be utilized, the latter being preferred. Strands of modified natural material such as strands coated or impregnated with a cellulose polymer or synthetic resin may also be used; likewise strands of several types may be used in the same sheet of material. Natural yarns which may be used for strands include cotton, hemp, jute, and wool; synthetic yarns which may be used include zein, viscose rayon, actate rayon, polyvinyl chloride, polyvinylidene chloride, co-polymers of polyvinyl and polyvinylidene chloride, co-polymers of vinyl chloride and vinyl acetate, polystyrenes, polyethylenes, polyamides, polyacrylonitriles, polyesters, cyanoethylated cotton, cellulose acetate and cellulose acetate butyrate.

Perfered materials for strands thus include multifilamentary materials such as polyamides (nylon), polyesters (Dacron and Terylene), polyacrylonitriles (Orlon) and cyanoethylated cotton (Fortisan) generally in the form of roving having a twist of from ½ turn per foot to 4 turns per inch.

Any suitable diameter or weight of yarn may be used, preferred weights being in the range of about 500 to 2400 denier.

The strands are arranged so that strand 3 and all parallel strands are exposed on one side of the sheet 1 and strand 4 and all parallel strands which run in a direction normal to strand 3 are exposed on the reverse side of sheet 1. The strands in all cases may be any distance apart but are preferably ¼ to ¾ inch apart. At the point of intersection of strands 3 and 4 an aperture 5 is present in the material, thusly enabling the strands to cross one another. This crossing of strands serves the purpose of enabling each of the strands to maintain its particular plane on the sheet.

FIGURE 2 is similar to FIGURE 1 but the strands are arranged in a somewhat different manner.

Strand 6 continues on one side of sheet 2 thence passes through aperture 8 in sheet 2 continuing on the reverse side of the sheet for a distance, thence passes up through aperture 9 and continues on the first said side of the sheet for a distance, thence upon reaching the extremity of the sheet changes direction substantially normal to the original direction and continues for a distance, thence changes direction substantially normal to its last mentioned direction and parallel to its first mentioned direction and and continues as before till it reaches the other extremity of the sheet where it repeats the "turning around" procedure. Strand 7 extends in a direction generally normal to strand 6 and continues in the same manner as strand 6, i.e., "woven" in and out of the sheet and crossing over and under strand 6 at juncture points which are the points at which the strands change sides of the sheet and cross adjacent strands.

It can be seen that any two parallel portions of either strand are on the same side of the sheet. It should be noted that in any given sample of the material only two strands are used.

FIGURE 3 is like FIGURE 2 except that each strand culminates at the extremities of the sheet opposite from that of FIGURE 2. As shown strand 11 extends on one side of sheet 1 then passes through aperture 12 then continues on the other side of the sheet for a distance the passes up thru aperture 13 and continues on the first said side of the sheet. Strand 10 does likewise crossing over and under strand 11 at the apertures.

FIGURES 4 and 10 discloses a more intricate configuration of strand. More specifically strand 13 is fastened at one extremity of sheet 1 and continues for a distance on one side of sheet 1 passing to the other side of the sheet through aperture 16 and continuing in a direction normal to its original direction. It then forms a loop around a group of strands at aperture 17 and retraces its direction to aperture 16 remaining on the same side of sheet 1. Strand 13 passes through aperture 16 and assumes a direction normal to its previous direction and substantially parallel to the original direction. Strand 13 continues this reoccurring pattern as do all parallel strands, for the extent of the sheet.

A second strand 15 is fastened to an extremity of the sheet 1 running at 90 degrees to said first extremity and on the reverse side of sheet 1 from the starting point of strand 13. Strand 15 continues for a distance then passes through an aperture assuming a direction normal to the original direction thence forming a loop 19 at aperture 18 around a group of parallel strands thence continues on the same side of the sheet back to aperture 16 thence passes thru same and thru the loop formed by said parallel strand then continues in its original direction to aperture 17 passing through the aperture and forming a loop at the next aperture 20.

It can thusly be seen that this particular configuration of stranding in essence amounts to a series of loops on opposite sides of the sheet running normal to one another for the extent of the sheet.

FIGURE 5 shows a method of fastening a strand 21 to the extremity of the sheet 1. The method incorporated is a strip 36' of pressure sensitive tape placed over the strand. The main characteristics the tape must have are an ability to adhere to the sheet and an ability at the same time to adhere to the strands.

FIGURE 6 discloses a sheet 30 having strands 31 to one side of which is adhered a second sheet 32 which has no strands. The addition of a second sheet serves to strengthen the original sheet, serves to make the resulting sheet waterproof as well as to add weight to same. The second sheet may or may not have strands but for the sake of convenience a second sheet having strands is not shown.

FIGURE 7 discloses another method for fastening the ends of a strand 33 to the sheet 34 which utilizes an adhesive 35 which is adapted to remain tacky or nonsetting permanently or at least for the life of the material which may be from 5–15 years. The adhesive may be transparent if a transparent embodiment of the structure is desired.

In FIGURE 8 a means for fastening the stranding disclosed in FIGURE 2 is shown wherein a pressure sensitive tape 36 is used to adhere strands 37 to sheet 38. In all cases wherein tape is utilized the adhesive on the tape must be or should be of the same general type as the adhesive disclosed in FIGURE 7, i.e., it must have the same general characteristics.

In FIGURE 9 a sheet 39 having strand 40 and 41 is shown juxtaposed between two additional sheets which may (not shown) or may not have stranding. As before the additional sheeting adds to the weight, achieves a water proof resulting sheet and serves to strengthen the material. As before the means for adhering the sheets together may be an adhesive of the type described in co-pending application 637,982, now United States Patent Number 2,851,389 or the same may be accomplished by heat sealing or stitching (not shown).

The additional sheets may be a similar polyester synthetic resin or may be another synthetic resin adapted to contribute other properties to the material such as printability, drape, feel, and so forth. It may for example be selected from the following group: polyethylene, plasticized or unplasticized films of polyvinyl chloride or polyvinyl acetate or polyvinylidene chloride or co-polymers of two or more of these, i.e., chlorinated polyethylene, chlorosulphonated polyethylene, polytetrafluoroethylene, polychlorotrifluoroethylene, other halogenated polyethylenes, polyamides, polyvinyl alcohol, regenerated cellulose, cellulose esters such as cellulose acetate, cellulose ethers such as ethyl cellulose.

It is critical to the invention that the films be nonfibrous and nonporous in order to allow the strands to slip and slide easily through the adhesive when the material is torn and to thus provide the desired tear-resistance. Material of a fibrous nature, such as paper and the like, is generally unsuitable.

It can thusly be seen that the methods of stranding as applied to reinforced tear resistant material add to the strength of same by building up a plurality of strands across a tear on both sides of the sheet thusly serving in most cases to limit the extent of the rip or tear.

While certain modifications and embodiments of the invention have been described, it is of course to be understood that there are a great number of variations which will suggest themselves to anyone familiar with the subject matter thereof and it is distinctly understood that this invention should not be limited except by such limitations as are clearly imposed in the appended claims.

We claim:
1. A nonrigid article comprising in combination a flexible web of apertured material and reinforcing strands, said strands having bight-like loops extending through said apertures, each of said loops having at least one loop from another of said strands extending from an adjacent aperture passing therethrough, said strands serving to reinforce said web, said strands being substantially unstressed.

2. The article of claim 1 wherein said web is comprised of flexible, foldable, plastomeric material.

3. A nonrigid article comprising in combination a flexible foldable sheet of synthetic resin film material, a plurality of apertures in said sheet, reinforcing strands of flexible material disposed in contacting adjacency to each side of said sheet of material, a plurality of crossing junctures of said reinforcing strands, junctures of said crossing junctures being disposed in said apertures in said sheet, said crossing junctures comprising strands disposed on opposite sides of said sheet, said strands being substantially unstressed in said article, said strands being slidable relative to said sheet and said apertures, said strands being fixedly attached to said film material only adjacent the edge extremities of said material.

4. An article as in claim 3 wherein said flexible sheet of material and said strands in conjunction therewith are provided in combination with at least a second sheet of film material, said article being laminated by means of non-setting adhesive, said second sheet of material being synthetic resinous and essentially non-porous and non-fibrous, said strands being slidable substantially only lengthwise through said apertures.

5. An article as in claim 3 wherein said strands are fixedly adhered with permanently tacky adhesive to said flexible sheet.

References Cited by the Examiner
UNITED STATES PATENTS 1,323,979 12/1919 Greeves _____ 161—52
2,708,177 5/1955 Fries et al. _____ 161—49

EARL M. BERGERT, *Primary Examiner.*

DOUGLAS J. DRUMMOND, *Examiner.*